United States Patent [19]

Bron

[11] 4,254,791
[45] Mar. 10, 1981

[54] FLOW RATE REGULATOR

[76] Inventor: Dan Bron, 36 Palmach St., Haifa, Israel

[21] Appl. No.: 130,517

[22] Filed: Mar. 14, 1980

[30] Foreign Application Priority Data

Mar. 26, 1979 [IL] Israel ..................................... 56948

[51] Int. Cl.³ ............................................. G05D 7/01
[52] U.S. Cl. .................................... 137/118; 137/115;
137/501; 137/853; 239/533.13; 239/542
[58] Field of Search ................ 137/115, 118, 501, 517,
137/853; 239/533.1, 533.13, 542

[56] References Cited

U.S. PATENT DOCUMENTS

| 3,797,754 | 3/1974 | Spencer | 239/542 |
| 3,812,876 | 5/1974 | Krieter | 137/501 |
| 3,980,104 | 9/1976 | Kabai | 239/533.13 X |
| 4,009,832 | 3/1977 | Tiedt | 239/542 |

FOREIGN PATENT DOCUMENTS 1523331 3/1968 France ..................................... 239/542

Primary Examiner—Robert G. Nilson

[57] ABSTRACT

There is provided an in-line regulator for pressurized fluids. The regulator comprises a regulator sleeve disposed in a tubular, fluid-carrying line or in constituent parts of the line and is provided with at least one wall orifice through which the line or the constituent part of the line communicates with the outside. The sleeve is constituted by two flange-like end portions fitting the tubular line and a central portion connecting the flange-like portions and having smaller outside dimensions than the flange-like portions, in such a way as to define, in conjunction with the flange-like portions and with the inside wall of the tubular line, an annular output space. The central portion is elastically deformable by an inflatory force and the annular output space communicates with the inside of the tubular line via at least one constant-cross-section opening in at least one of the portions, and with the outside via the wall orifice.

5 Claims, 3 Drawing Figures

FLOW RATE REGULATOR

The present invention relates to an in-line flow regulator for pressurized fluids, more particularly a flow regulator permitting a fluid output flow at a controlled, constant flow rate regardless of fluid-pressure variations either upstream or downstream of the flow regulator.

Various types of flow regulators are known in the art, some of which, although marketed as such, are not really regulators in the above defined sense at all, being merely restrictive flow-reducing devices whose output rate substantially depends on the fluid pressure on their input side. Other devices, which are true flow regulators are relatively complicated contraptions, such as that disclosed in U.S. Pat. No. 3,357,448 which uses a spring as reference force and a tapered, needle-valve-type flow-restricting element actuated by an elastomer diaphragm. Another, similar type of flow regulator is disclosed by U.S. Pat. No. 3,886,968, which differs from the above prior-art device only in that the separate flow-restricting element is replaced by a central, non-elastic section of the diaphragm itself. In both devices the diaphragms act only as a sort of piston, separating a higher-pressure region from a lower pressure region and moving against spring force, until equilibrium is established between the inlet pressure acting on the diaphragms on one side, and the elastic force of the reference spring acting on the other side. Both these devices are relatively complex, need specially shaped outlet ports and/or diaphragms and are liable to be affected spring hysteresis and/or fatigue, and are also not easily assembled. An improvement with respect to these two prior-art devices is proposed by Israel Patent Application No. 50771, which also uses a flat diaphragm. This diaphragm, however, is used not only as a separating element as in the first two prior-art devices, but also as the feedback element, its elastic properties constituting the reference force. Yet this prior-art device, too, suffers from an important disadvantage in that it is not an in-line device, i.e., it is not part of the high-pressure line and, when used, e.g., in drip irrigation, constitutes an encumberance, making it difficult to drag the high-pressure line, to which it is externally attached, along the ground, and, after the season, to coil it up for storage or transport.

It is one of the objects of the device according to the invention to overcome these difficulties and draw-backs and to provide an in-line, series-connectable flow regulator employing the negative-feedback principle, being extremely simple in design and assembly and having a minimal number of components.

This object the invention achieves by providing an in-line flow regulator for pressurized fluids, comprising a regulator sleeve disposed in a tubular, fluid-carrying line or in constituent parts thereof, provided with at least one wall orifice through which said line or constituent part thereof communicates with the outside, which sleeve is constituted by two flange-like end portions fitting said tubular line and a central portion connecting said flange-like portions and having smaller outside dimensions than said flange-like portions, in such a way as to define, in conjunction with said flange-like portions and with the inside wall of said tubular line, an annular output space, wherein said central portion is elastically deformable by an inflatory force and wherein said annular output space communicates with the inside of said tubular line via at least one constant-cross-section opening in at least one of said portions, and with the outside via said wall orifice.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
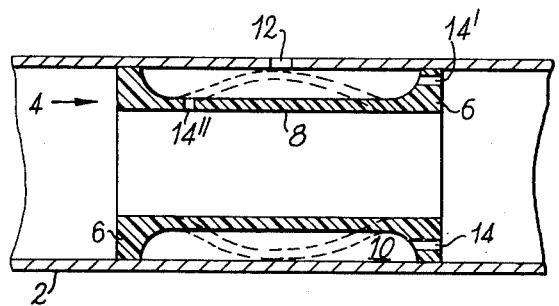
FIG. 1 is a cross-sectional view of an embodiment of the flow regulator according to the invention.

There is shown in FIG. 1 a section of a tubular, fluid-carrying high-pressure line 2 into which there is inserted a regulator sleeve 4. This sleeve 4 is constituted by two flange-like end portions 6 fixedly held in the line 2 by friction or other retaining means, and a central portion 8 which has smaller outside dimensions than the end portions 6, in such a way as to define, in conjunction with the end portions 6 and the inside wall of the line 2, an annular output space 10. Preferably the entire regulator sleeve 4, but at least the central portion 8 is made of an elastomer and is thus elastically deformable. The line 2, or parts thereof a plurality of which would constitute such a line, is provided with at least one wall orifice 12 through which it communicates with the outside. In this context, "outside" is understood to mean either the immediate surroundings of the line 2, e.g., the soil, or any other consumer, nearby or remote. The annular output space 10 communicates with the inside of the line 2 via at least one opening 14 and/or 14' and/or 14", and with the outside via the wall orifice 12, which is preferably located substantially in the radial plane of symmetry of the central portion 8. It should be noted that the openings 14 or 14' or 14" have a constant cross section which is substantially unaffected by pressures or other flow variables.

In operation, the flow regulator according to the invention functions as follows: The fluid, e.g., water, flows through the opening 14 (14', 14") into the annular output space 10 and through the wall orifice 12 to the outside, e.g., the soil, or to whatever consumer is envisaged. With increasing output flow rate, a pressure drop develops across the opening 14 (14', 14") which takes the form of a force acting on the elastically stretchable central portion 8 from its inside outwards, causing it to "inflate", as indicated by the broken line. A further increase in the output rate will also increase the "inflatory" force until the bulging central portion 8 will partly obturate the wall orifice 12, preventing any further rise of the output, thereby, at a given differential pressure, also preventing any further rise of the pressure drop, which in its turn prevents any further increase in the "inflatory" force and thus any further restriction of the wall orifice 12. This is in fact the working point of the regulator and any change in the flow parameters will immediately cause an opposing corrective action by negative feedback, until the working point is restored. Should, for instance, the pressure in line 2 drop, the pressure drop across the opening 14 will also drop, causing the inflatory force to drop, too, thereby reducing the bulge of the central portion 8 and thus increasing the effective cross section of the wall orifice 12, until a new equilibrium is established between the pressure-drop-caused inflatory force and the elastic restoring force of the central portion 12, thus permitting the reduced line pressure to produce the same output. When, on the other hand, the pressure in line 2 rises, so will the pressure drop across the opening 14 as well as the inflatory force, thereby increasing the bulge and reducing the effective cross section of the wall orifice 12, thus preventing the increased line pressure from increasing the output rate.

The working point of the regulator is determined by two parameters: the elastic, inflation-resisting force of the central portion 8 or, at a given elastic force, the translatory movement required to get the midsection of the central portion 8 into the obturating position, in other words, the difference between the outside dimensions of the central portion 8 and the inside dimensions of the tubular line 2.

Figure 2:
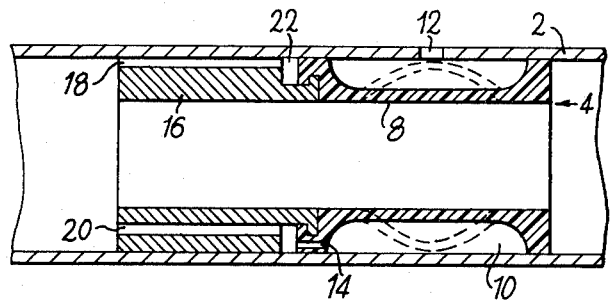
FIG. 2 is a cross-sectional view of another embodiment of the flow regulator.

FIG. 2 shows another embodiment of the flow regulator according to the invention. In this embodiment there has been added a flow-restricting element 16 on one side of the regulator sleeve 4, which element 16 is fixedly attached to the sleeve 4. This element 16, made of any suitable material not necessarily elastic is provided with at least one flow-restricting passage in the form of a groove 18 which, together with the inside wall of the tubular line 2 defines such a passage, or in the form of a bore 20, or a combination thereof. Either of these passages starts at the free end of the element 16 and leads into an annular groove 22 which communicates with the annular output space 10 of the sleeve 4 via an opening 14. Water entering the restricting passage 18 or 20 will thus be able to enter the annular output space 10 and to reach the outside via the wall orifice 12. The regulating action of this embodiment is entirely analogous to that of the embodiment of FIG. 1, the restricting element enabling it to produce small outputs also at higher line pressures.

Figure 3:
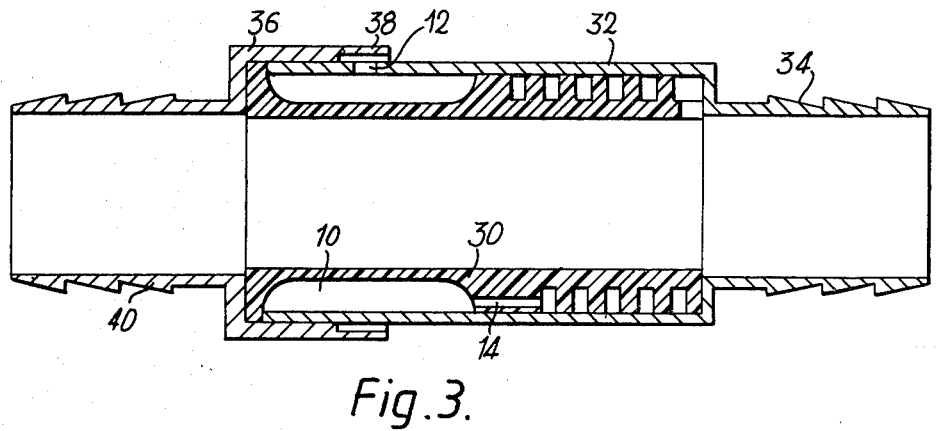
FIG. 3 is a cross-sectional view of yet another embodiment of the flow regulator according to the invention.

FIG. 3 is yet another embodiment of the invention. Here, the regulator sleeve and the restricting element are one integral unit 30, made of one and the same elastomer. The restricting part of this unit 30 may be in the form of a helical groove extending from one of its ends and leading into the annular output space 10, or else a zig-zagging meander or any other labyrinth device having a similar flow-restricting effect. The unit 30 is accommodated in a tubular housing 32, one end 34 of which is stepped down to provide an abutment for the unit 30 and is suitably shaped to permit connection into a section of the tubular line 2 (not shown). The other end of the housing 32 is tightly closed by a lid-like cover 36, at least part of the rim 38 of which serves also as a guard shield for the wall orifice 12. The free end 40 of the cover 36 is stepped down to provide an abutment for both the lid-side end of the housing 32 and the unit 30, and is suitably shaped to permit connection into another section of the tubular line 2 (not shown). The action of this embodiment is completely analogous to that of the two previously described embodiments. It is also obvious that, while the tubular line and all its accessories are preferably of a circular cross section, it may have any other convenient cross section, e.g., polygonal. It is also conceivable to replace either the housing 32 or the lid-like cover 36 by section of the line 2 itself. Furthermore, it should be pointed out that the restrictive section of the unit 30 must be rigid enough so as to prevent collapsing of the passage ways due to line pressure.

While particular embodiments of the invention have been described, it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An in-line flow regulator for pressurized fluids, comprising a regulator sleeve disposed in a tubular, fluid-carrying line or in constituent parts thereof, said line or constituent part thereof communicating with the outside via at least one wall orifice provided therein, which sleeve is constituted by two flange-like end portions fitting said tubular line and a central portion connecting said flange-like portions, in such a way as to define, in conjunction with said flange-like portions and with the inside wall of said tubular line, an annular output space wherein said central portion is elastically deformable by an inflatory force and wherein said annular output space communicates with the inside of said tubular line via at least one of said portions, and with the outside via said wall orifice.

2. The flow regulator as claimed in claim 1, wherein a flow-restricting element is attached to said regulator sleeve, through which element said line communicates with said output space.

3. The flow regulator as claimed in claim 2, wherein said flow restricting element is an integral part of said regulator sleeve.

4. The flow regulator as claimed in claim 3, wherein said regulator sleeve and integral restricting element are accommodated in a tube-like housing, the one end of which is adapted to be connected into a section of said tubular line, and the other end of which is closable by a lid-like cover adapted to be connected into another section of said tubular line.

5. The flow regulator as claimed in claim 4, wherein at least part of the rim of said lid-like cover serves as a guard shield for said wall orifice.

* * * * *